United States Patent [19]
Ozygus et al.

[11] Patent Number: 5,946,330
[45] Date of Patent: Aug. 31, 1999

[54] MULTIPLE PATH RESONATOR WITH LONGITUDINAL PUMP ARRANGEMENT

[75] Inventors: Bernd Ozygus; Juergen Erhard, both of Berlin, Germany

[73] Assignee: Daimler-Benz AG, Stuttgart, Germany

[21] Appl. No.: 08/865,716

[22] PCT Filed: Nov. 28, 1995

[86] PCT No.: PCT/EP95/04677

§ 371 Date: Nov. 24, 1997

§ 102(e) Date: Nov. 24, 1997

[30] Foreign Application Priority Data

Nov. 30, 1994 [DE] Germany .............................. 44 44 511

[51] Int. Cl.⁶ ............................................. H01S 3/098
[52] U.S. Cl. ............................... 372/19; 372/22; 372/71; 372/93; 372/99
[58] Field of Search ................................. 372/69, 70, 72, 372/75, 71, 19, 22, 66, 93, 99

[56] References Cited

U.S. PATENT DOCUMENTS

| | | | |
|---|---|---|---|
| 3,365,671 | 1/1968 | Kogelnik | 359/346 |
| 4,578,793 | 3/1986 | Kane et al. | 372/71 |
| 4,870,649 | 9/1989 | Bobeck et al. | 372/19 |
| 5,021,742 | 6/1991 | Jacob | 372/66 |
| 5,151,917 | 9/1992 | Perilloux et al. | 372/99 |
| 5,237,584 | 8/1993 | Shannon et al. | 372/93 |
| 5,745,511 | 4/1998 | Leger | 372/19 |

FOREIGN PATENT DOCUMENTS 0 455 383  11/1991  European Pat. Off. ........ H01S 3/109

OTHER PUBLICATIONS

A.L. Pardue, Jr. et al., "Reactive Q Switching In A $CO_2$ Multimode–Multipass Laser Oscillator", IEEE Journal of Quantum Electronics, No. 11, Nov. 1970 (pp. 753–754).

I.A. Ramsay et al., "A Ray Analysis Of Optical Resonators Formed By Two Spherical Mirrors", Applied Optics, vol. 9, No. 2, Feb. 1970 (pp. 385–398).

P.V. Korolenko et al., "Main Properties And Potential Practical Applications of M–Mode Lasers", Quantum Electronics, vol. 25, No. 6, Jun. 1995 (pp. 536–539).

*Primary Examiner*—James W. Davie
*Attorney, Agent, or Firm*—Evenson, McKeown, Edwards & Lenahan, P.L.L.C.

[57] ABSTRACT

Longitudinal diode-pumped solid-state lasers currently have maximum power outputs of no more than a few watts. By using resonators with several reflection sites inside the active medium, the output power of these lasers can be boosted accordingly. The configuration proposed here differs from known designs in being far easier to handle and less costly to manufacture.

6 Claims, 3 Drawing Sheets

MULTIPLE PATH RESONATOR WITH LONGITUDINAL PUMP ARRANGEMENT

CROSS-REFERENCE TO RELATED APPLICATIONS

This application is 371 of PCT Application No. PCT/EP95/04677 filed on Nov. 28, 1995.

BACKGROUND AND SUMMARY OF THE INVENTION

The invention relates to a longitudinally pumped solid-state laser of a high output power and, more particularly, to a solid-state laser in which the laser modes are longitudinally pumpable within the laser-active medium at several sites using pumped beams.

When longitudinally pumping solid-state lasers, particularly by means of laser diodes as a pumping source, the output power is limited either because of the limited available output power of a pumping source or because of temperature effects in the active medium.

This limitation can be bypassed by the use of resonators having several reflection sites within the active medium. It is a problem of the known arrangements of this type that the number of components to be adjusted increases in comparison to linear resonators. This makes handling more difficult and increases the preparation costs. The present invention is therefore based on the object of eliminating the disadvantages of the state of the art.

According to the invention, this object is achieved by a solid-state laser in which the laser modes are longitudinally pumpable within the laser-active medium at several sites by means of pumped beams. An OFF-AXIS multiple path mode situated in a plane given by:

$$M_{n,x_0} = \sum_i \lambda_{n,in}(x_0) TEM_{in,o}(x)$$

$$\lambda_{n,in}(x_0) = \sqrt{\frac{n \langle n \rangle^{in} e^{-\langle n \rangle}}{(in)!}} \qquad \langle n \rangle = \frac{x_0^2}{w_0^2}$$

can be excited in a targeted manner by the beaming-in of the pumped light distribution at the site of the intensity maxima. By locally structured loss sites, for example, by means of notches or partial metallizations, other modes can be discriminated. By means of a locally structured reflectivity or transmission of the output mirror, a percentage of an intensity lobe can be decoupled with the frequency of the laser transition of the used active material.

It is an advantage of the present invention that the multipath modes are "OFF-AXIS" in that the modes do not travel along the optical axis in the resonator. This contrasts with conventional "ON-AXIS" modes in which the fundamental mode travels along the optical axis defined by two exterior mirrors in the resonator.

In the case of a conventional ON-AXIS system, the path of the light in the resonator is determined only by the geometry of the resonator mirror which determines the optical axis of the system. By pumping the laser on the optical axis, the fundamental mode is excited. If the pumped light arrangement is removed from the optical axis, higher Gauβ-Hermite or Gauβ-Laguerre modes will lase. In the case of a fundamental-mode laser, the lasing mode element is a one-dimensional function space. It therefore has no degree of freedom as far as the transversal structure is concerned.

It is an advantage of the present invention that an OFF-AXIS multiple path mode system is used, in which the determining factor is the local distribution of the population inversion in the active medium of the laser resonator. OFF-AXIS multiple paths modes are elements of infinitely dimensional function spaces. From these function spaces, which depend on the resonator geometry, the multiple path mode is excited which has the largest overlap with the inversion distribution, and thus the highest intensification.

It is an advantage of the present invention that a decoupling of only a portion of the local intensity distribution occurs. The present invention is based on the interaction between the locally structured intensifier profile and the locally structured loss mechanisms. This interaction achieves the excitation of the OFF-AXIS multiple path modes and the mode selection in comparison to the Gauβ-Hermite and Gauβ-Laguerre modes which, in a normal case, have a higher intensification and a reduced inversion. It is also an advantage of Applicants' invention to provide local structuring of the output mirror. The present invention provides an output mirror design having different degrees of reflection or transmission at different sites on the mirror.

Details of the invention are found in the description in which, by means of the drawing, the state of the art and several advantageous embodiments according to the invention are explained.

DETAILED DESCRIPTION OF THE DRAWINGS

Figure 2:
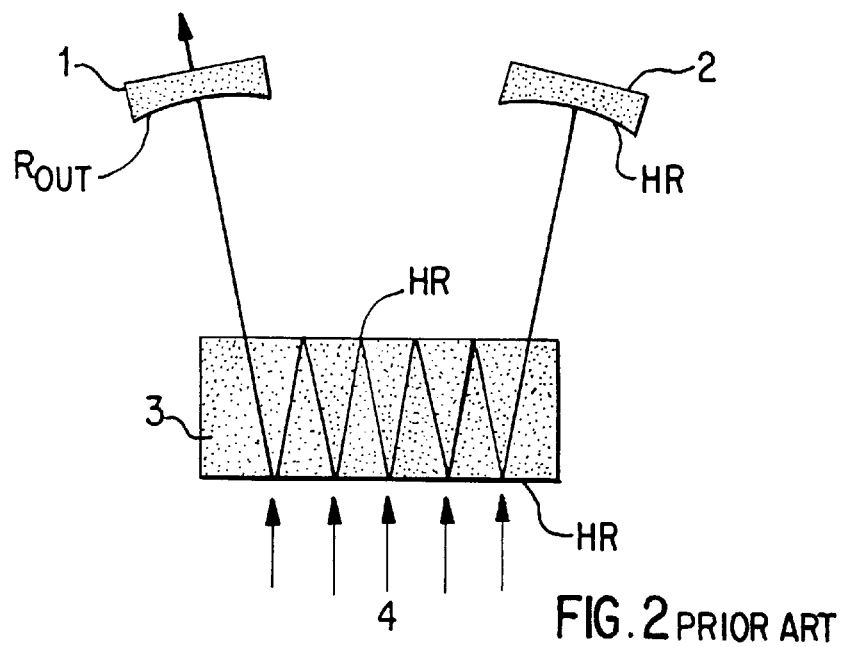
FIG. 2 is a schematic view of an embodiment according to the state of the art.
Figure 3:
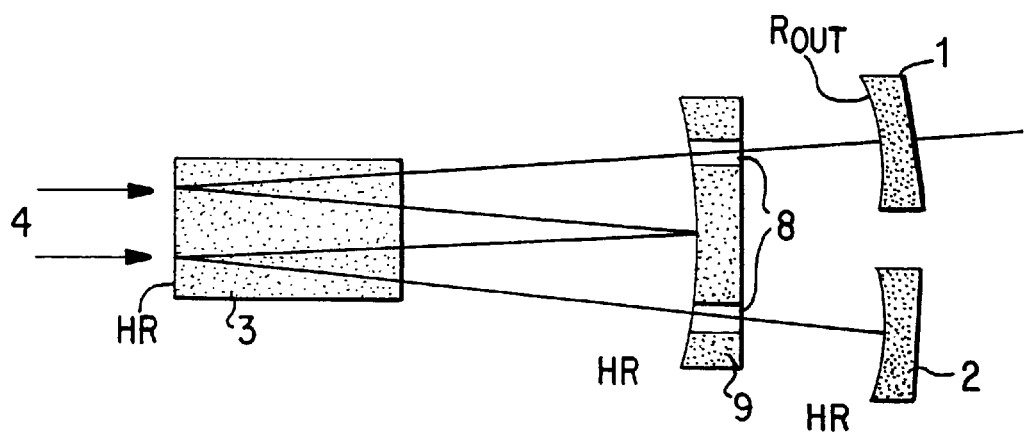
FIG. 3 is a schematic view of another embodiment according to the state of the art.

FIGS. 2 and 3 show two embodiments according to the state of the art. In the case of the geometry illustrated in FIG. 2, several equidistant reflection sites are created within the active medium 3 which can be longitudinally pumped by means of several pumped beams 4. The actual laser resonator is formed of the highly reflective (HR) mirror 2 and the partially reflective output mirror 1.

In the embodiment of FIG. 3, the beam is folded by means of a mirror 9 and is decoupled through bores 8 in the mirror 9. The resonator is again formed by two additional mirrors, the HR mirror 2 and the output mirror 1.

As initially mentioned, a problem with these arrangements is that the number of components to be adjusted increases in comparison to linear resonators. This makes the handling difficult and increases the production costs.

Figure 1:
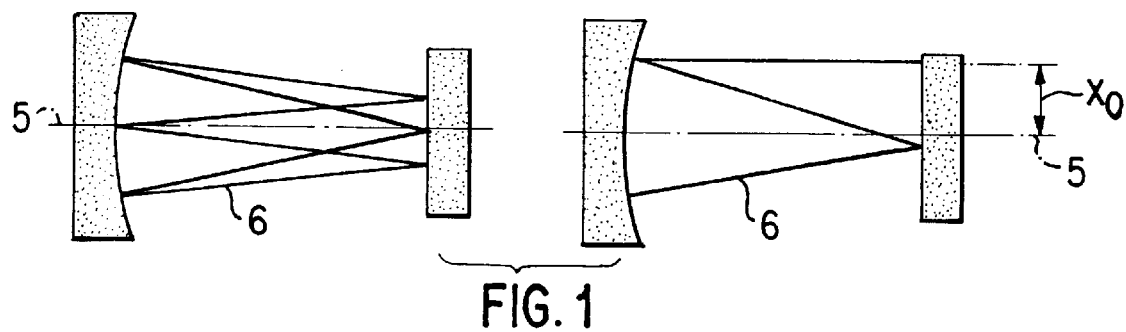
FIG. 1 is a schematic view of the modes occurring in the resonator.

In resonators in which the bending radii of the two resonator mirrors $\rho_1$ and $\rho_2$ are in the relationship indicated by Equation 1 (below) to the resonator length $L_{reso}$, the "multiple-path modes" described in the following, in addition to the Gauβ-Hermite-Polynomes (GHP) and the Gauβ-Laguerre-Polynomes (GLP) known from literature represent stationary radiation fields.

$$\left(1 - \frac{L_{Reso}}{\rho_1}\right)\left(1 - \frac{L_{Reso}}{\rho_2}\right) = \cos^2\left(\pi\frac{m}{n}\right) \quad m = 1, ..., n \qquad \text{Eqn. (1)}$$

n being the order of the multiple path mode. FIG. 1 shows two different multiple path modes 6 of the order n=3. The multiple path modes 6 are different than the GHP's and the GLP's in that they do not extend along the optical axis 5 of the resonator, that is, they are OFF-AXIS. The modes illustrated in FIG. 1 on the right can be described for m=1 by means of Equation 2.

$$M_{n,x_0} = \sum_i \lambda_{n,in}(x_0) TEM_{in,o}(x) \qquad \text{Eqn. (2)}$$

$$\lambda_{n,in}(x_0) = \sqrt{\frac{n\langle n\rangle^{in} e^{-\langle n\rangle}}{(in)!}} \qquad \langle n\rangle = \frac{x_0^2}{w_0^2}$$

In this case, the squares of the factors $\lambda_{n,in}(X_0)$ of the modes correspond to a Poisson's distribution. The parameters of these modes are the discrete order n and the continuous distance $X_0$, of the extreme intensity lobe to the optical axis 5 (see FIG. 1). In this case, the functions $TEM_{ij}$ correspond to the field distributions of the GHP's. The larger the distribution parameter <n> of Poisson's distribution, the larger the distance $X_0$ to the extreme intensity maximum to the optical axis 5, $W_0$ being the fundamental mode radius of the resonator. In contrast to the known GHP's or the GLP's, the multiple path modes do not represent a discrete, but rather a continuous mode family, in the case of which the frequency of the laser mode is continuously a function of the parameter of the mode family.

The condition for a multiple path resonator can also be defined by way of the frequency degeneration of the transversal modes. In a multiple path resonator of the order n, those transversal Gauβ-Hermite modes are frequency-deteriorated in the case of which the transversal order differs by n and the longitudinal orders differ by 1, in which case only one direction in space must be considered.

Figure 4:
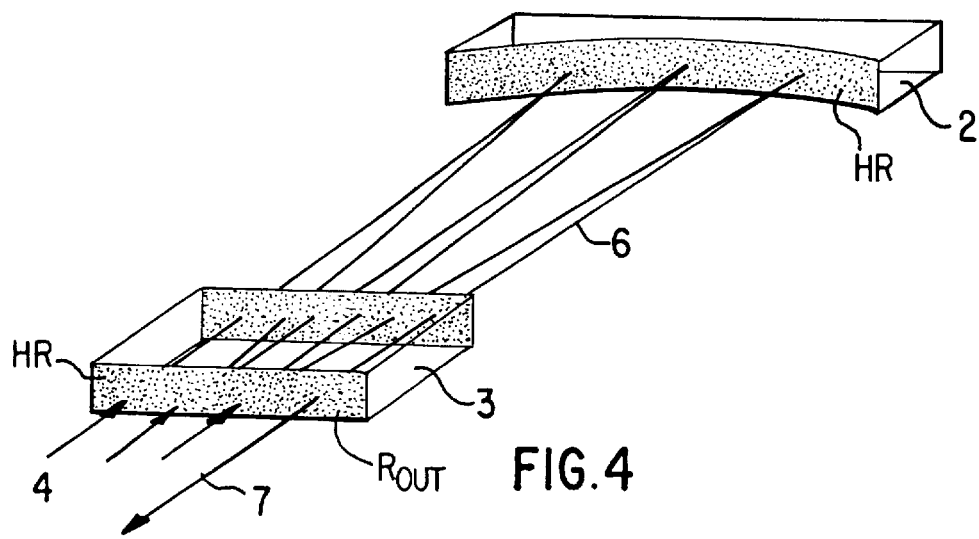
FIG. 4 is a schematic view of a multiple path mode of the order n=6.
Figure 5:
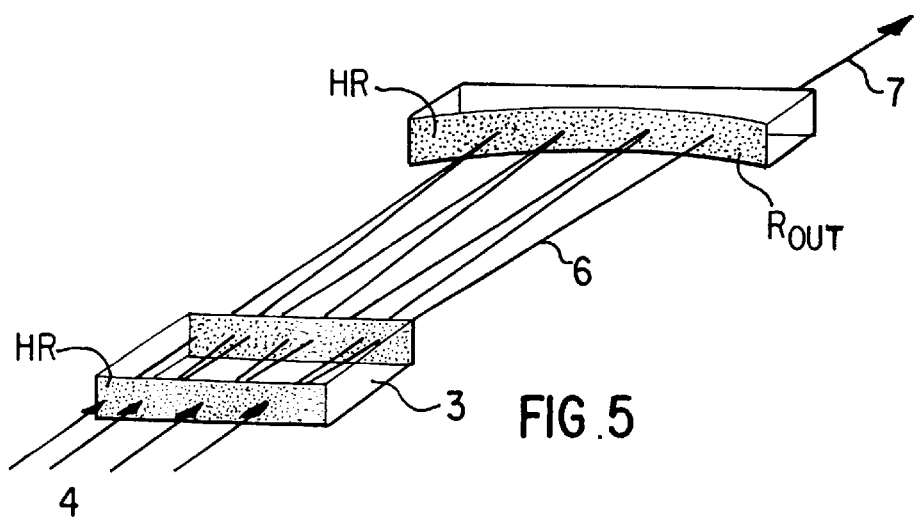
FIG. 5 is a schematic view of the multiple-path mode of the order n=7.

The multiple path modes can be excited in a targeted manner by the beaming-in of the pumped beams at the site of the intensity maxima. By means of a locally structured reflectivity of the output mirror, it can also be achieved that only one intensity lobe of the multiple path mode is decoupled. The embodiment of FIG. 4 shows a multiple path mode 6 of the order n=6. In this example, the output mirror $R_{out}$ is situated directly on the active medium 3. The multiple path mode 6 is pumped by means of three pumped beams 4. Only at the site of an intensity lobe of the multiple path mode is the reflectivity of the output mirror suitable for significantly decoupling radiation so that only a partial beam 7 of the mode leaves the resonator. FIG. 5 illustrates a multiple path mode 6 of the order n=7. As in FIG. 4, the resonator has a semi-monolithic construction. Here, the decoupling takes place by way of the resonator mirror which is not situated on the crustal.

The multiple path modes illustrated so far are special cases. Generally, the reflection sites on a resonator mirror are situated on an ellipse. In the illustrated cases, the ellipse has degenerated to a line.

Figure 6:
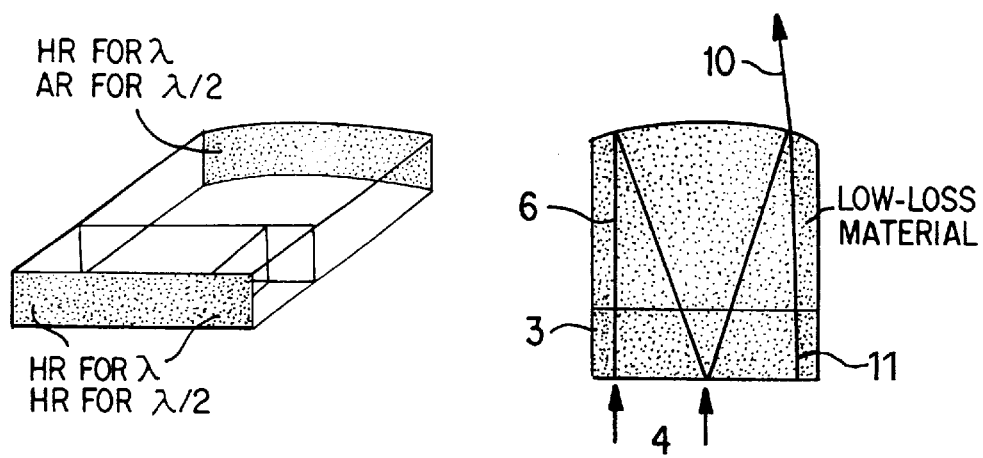
FIGS. 6 and 6a are views of the construction of an assembled resonator.
Figure 6A:
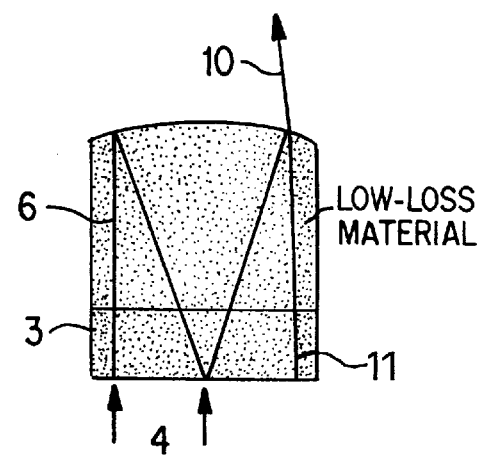

When a monolithic resonator is used, the construction becomes particularly simple. Here, all parts to be adjusted are eliminated. FIGS. 6 and 6a show a monolithic resonator which was composed of several materials. In this embodiment, a frequency doubling takes place within the resonator in a crystal 11. Only the frequency-doubled radiation 10 is decoupled.

Figure 7:
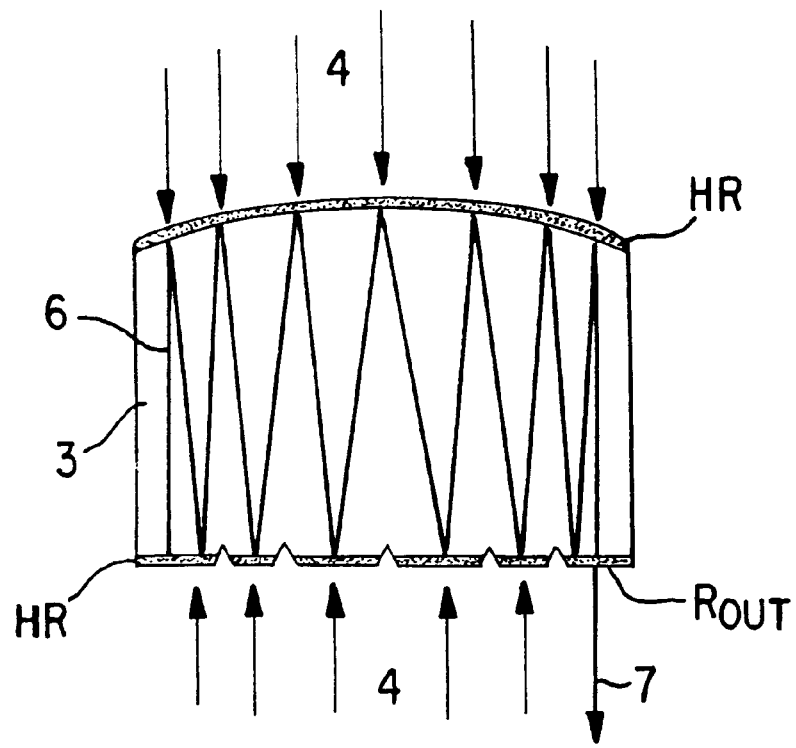
FIG. 7 is a view of the conditions in a one-piece resonator in the case of the discrimination of the modes by notches.

In the embodiment of FIG. 7, the monolithic resonator consists completely of active material 3. Here, the reflection sites can be pumped on both faces of the laser crystal.

Figure 8:
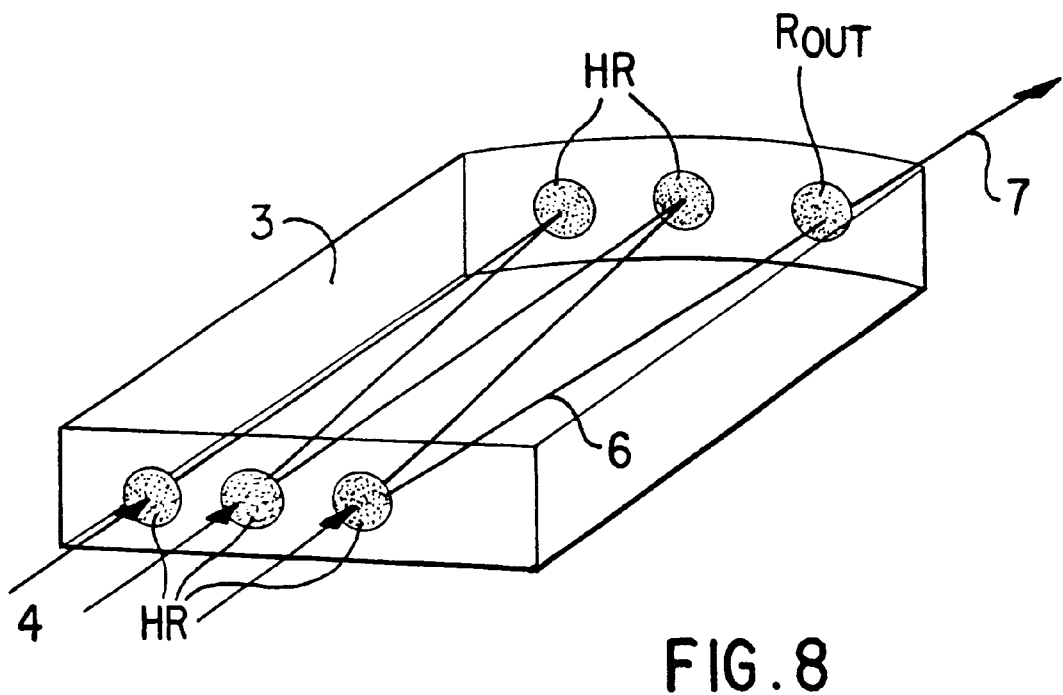
FIG. 8 is a view of the conditions in a one-piece resonator in the case of a discrimination of the modes by differently metal-coated sites.

In order to achieve a sufficient mode discrimination in comparison to the GHP's or the GLP's of the resonator, the ratio of the intensification to the losses in the case of the lasing multiple path mode must be larger than in the case of the GHP's or the GLP's. For this purpose, losses entered in a targeted manner, for example, thin wires in the resonator, can be used. In the example of FIG. 7, the discrimination takes place by way of notches in the laser crystal provided between the pumping sites. In the example, the mode is pumped by means of twelve pumped beams 4. In the embodiment which is perspectively illustrated in FIG. 8, in the case of a monolithic resonator, the discrimination is achieved in that only the reflection sites (HR) of the multiple path mode to be generated are correspondingly metallized.

What is claimed is:

1. Solid-state laser in which laser modes are longitudinally pumpable within a laser-active medium at several sites via pumped beams, wherein an OFF-AXIS multiple path mode situated in a plane given by:

$$M_{n,x_0} = \sum_i \lambda_{n,in}(x_0) TEM_{in,o}(x)$$

$$\lambda_{n,in}(x_0) = \sqrt{\frac{n\langle n\rangle^{in} e^{-\langle n\rangle}}{(in)!}} \qquad \langle n\rangle = \frac{x_0^2}{w_0^2}$$

is excited in a targeted manner by a beaming-in of said pumped beams at a site of an intensity maxima;

wherein additional modes are discriminated via locally structured loss sites; and wherein via one of a locally structured reflectivity and a transmission of an output mirror of said solid-state laser, a percentage of an intensity lobe is decoupled with a frequency of a laser transition of said laser-active medium.

2. Solid-state laser according to claim 1, wherein said output mirror is situated on said laser-active medium.

3. Solid-state laser according to claim 1, further comprising a frequency multiplication device provided for said decoupling from a resonator.

4. Solid-state laser according to claim 1, wherein a resonator of said solid-state laser has a monolithic construction.

5. Solid-state laser according to claim 1, wherein reflection sites of said laser are not arranged on a line such that said OFF-AXIS multiple path mode is not planar.

6. Solid-state laser according to claim 1, wherein said locally structured loss sites are formed by one of notches and partial metallizations of an output mirror of a resonator.

* * * * *